Figure 1:
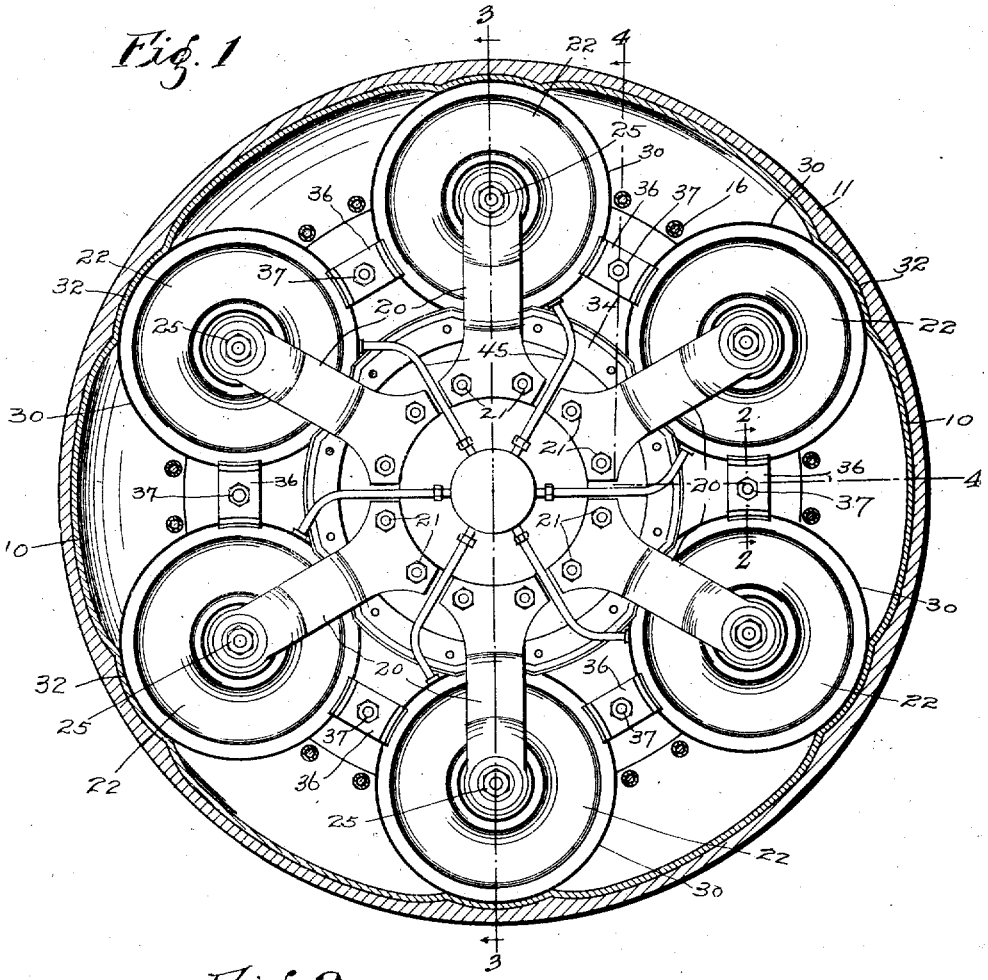

H. B. COATS.

VEHICLE WHEEL.

APPLICATION FILED APR. 27, 1917.

Reissued May 7, 1918.

14,467.

2 SHEETS—SHEET 1.

INVENTOR
HENRY B. COATS
BY Lockwood, Lockwood
ATTORNEYS

H. B. COATS.

VEHICLE WHEEL.

APPLICATION FILED APR. 27, 1917.

Reissued May 7, 1918.

14,467.

2 SHEETS—SHEET 2.

INVENTOR
HENRY B. COATS

By Lockwood & Lockwood
ATTORNEYS.

UNITED STATES PATENT OFFICE.

HENRY B. COATS, OF VEEDERSBURG, INDIANA.

VEHICLE-WHEEL.

14,467. Specification of Reissued Letters Patent. Reissued May 7, 1918.

Original No. 1,193,455, dated August 1, 1916, Serial No. 752,655, filed March 7, 1913. Application for reissue filed April 27, 1917. Serial No. 165,039.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to provide an improved construction of vehicle wheel which is resilient enough for automobile use and may have an entirely puncture proof tire and is capable of standing up to the work which would be required in an automobile.

A feature of the invention consists in providing within the wheel a floating structure which carries the axle and load and which is supported by a plurality of pneumatic annual cushions located within the wheel, the inner portion of each annular cushion being clenched in an annular metal rim which is U-shaped in cross section and one of a series concentric with the tire rim and likewise concentric with a solid rubber tire surrounding said rim. A portion of the outer part of each annular cushion is embedded within the annular metal or tire rim which is enveloped by the solid cushion tire, the inner edge of the solid cushion tire being on about the same level as the inner edge of each annular cushion. Therefore, the outer portion of each pneumatic annular cushion adjacent to the tire is located with reference to the solid rubber tire in substantially the same relation as the inner pneumatic tube is located with reference to the outer casing of the pneumatic tire. This causes the wheel to operate successfully and it overcomes the danger of lateral thrust or strain as when an automobile turns a corner under speed.

Another feature of the invention is that each annular cushion is supported by an external rim which, in the present instance, is associated with the cushion by clenching flanges, but, of course, may be associated therewith in any other suitable manner. The several cushion supporting rims are arranged in a circular series within the outer tire rim and means is provided for preventing relative rolling. The circular series of cushion supporting rims is also held in place by a central ring or member which contacts therewith in such manner that the central member and the circular series of cushion supporting rims are firmly nested within the tire rim, said tire rim being under circumferential tension while the inner rims and member are under compression. A very light composite wheel structure of great strength, both radially and laterally, is thus produced.

Another feature of the invention consists in forming the clenching rim of each pneumatic cushion of two annular side portions or halves and they are forced and held together by the recessed portion of the metal rim on the outer side of each annular cushion and by a pair of oppositely located wedging clamping plates or rings on the inner side and by a pair of oppositely located wedging clamping braces at points about midway between the outer and inner sides of the annular cushion, these wedging members serving to firmly nest the cushion-supporting rims within the tire rim so as to produce a unitary structure.

Another feature of the invention consists in the particular means for mounting the load so that it will be carried by the inner peripheries of the annular cushions. An other clencher rim is provided within each cushion which is held together by clamping portions of a pair of plates which supports the load.

Another feature of the invention consists in making a dust proof joint between the side plates and the movable parts of the wheel so that no dust can get therein.

Figure 2:
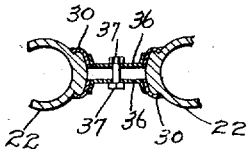
Figure 3:
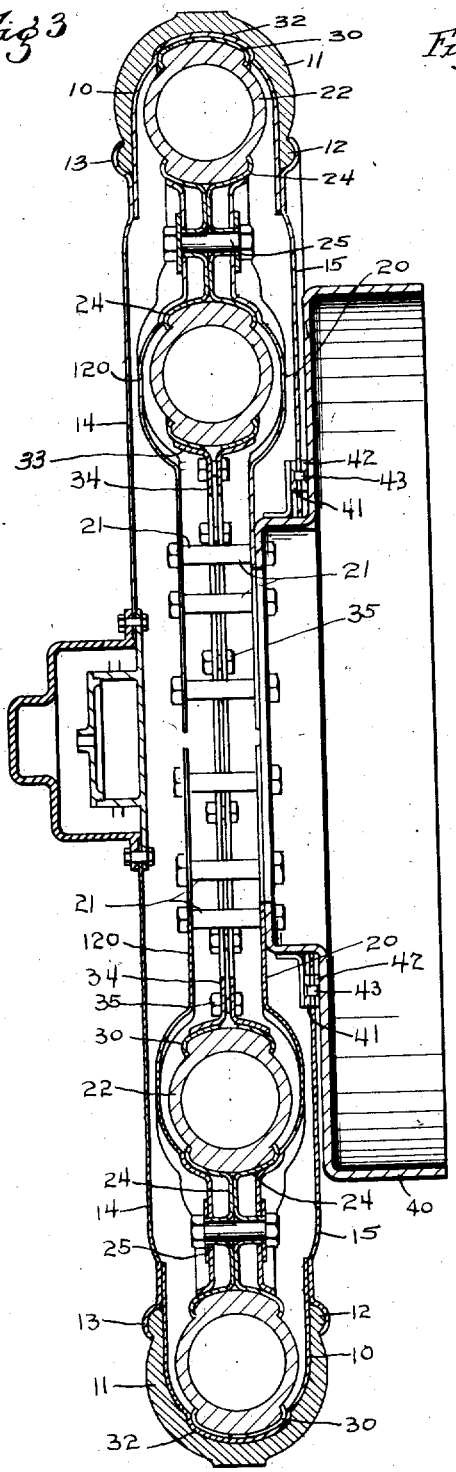
Figure 4:
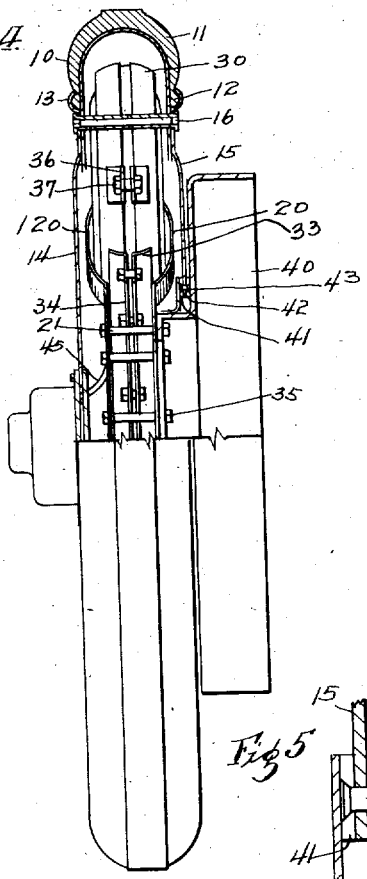
Figure 5:
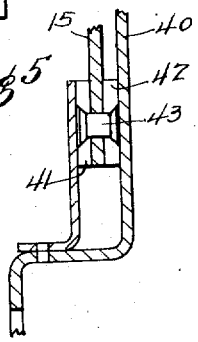
Figure 6:
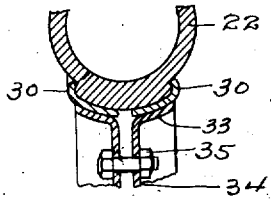

The full nature of the invention will be understood from the accompanying drawings and the following description and claims:

In the drawings, Figure 1 is a central cross section through the vehicle wheel, showing the intermediate parts in elevation. Fig. 2 is a section on the line 2—2 of Fig. 1. Fig. 3 is a transverse section on the line 3—3 of Fig. 1. Fig. 4 is an end view partly in section on the line 4—4 of Fig. 1. Fig. 5 is a radial section on a larger scale of a portion of the wheel through the joint between the inner and outer frames. Fig. 6 is a transverse section through a part of the inner portion of a cushion and the means for clenching it.

In detail the drawings herein show wheel having a continuous annular metal tire rim 10 which is U-shaped in cross section and around it there is a solid rubber tire 11 which is substantially the shape of the outer casing of an ordinary pneumatic tire and it has beads 12 along its inner peripheries which are clamped by annular clenching portions 13 which are on the outer periphery of side plates 14 and 15. These side plates 14 and 15 are clamped or drawn together by bolts 16 which clamp the beads 12 of the rubber tire 11 tightly against the metal rim 10, whereby said parts are readily secured together.

Within the foregoing structure formed of the side casings and tire of the wheel, there is a floating frame which carries the load. Said floating frame consists of side bars 20 which extend radially of the hub and they are arranged in pairs, carrying bolts 21 at their inner ends which are adapted to be secured to the axle which is not here shown. Between the outer ends of each pair of bars 20 an annular pneumatic cushion 22 is mounted. To that end the inner periphery of each annular cushion 22 is thickened and the thickened portion thereof clenched by a rim composed of a pair of oppositely placed clenching rings 24 which lie between portions of the bars 20 and the latter are clamped against the clenching rings 24 by bolts 25. To that end the bars 20 are shaped, as shown in Fig. 3, so as to lie against the pair of clenching rings 24 and bear against them when drawn down by the bolts 25 so as to cause said rings 24 to clench and hold the inner peripheries of the pneumatic cushions.

The outer periphery of each pneumatic cushion is thickened to form a rib which is clenched in an annular clencher rim formed by clencher rings 30 which surround the cushion 22. Said clencher rings 30 are embedded in a depression or recess at 32 in the annular metal rim 10 so that tangential thrust will not dislodge said parts. The inner portions of the clencher rings are held and clamped together by the curved edges 33 of a pair of annular plates 34 which are drawn and held together for clamping by bolts 35, as shown in Figs. 1 and 6. Therefore, the two annular plates 34 when drawn together by the bolts 35 will constitute a centrally located annular member with laterally turned edges 33 which engage the adjacent portions of the outer peripheries of the series of the annular cushion clencher rims and compress said series of cushion clencher rims between the outer tire rim 10 and said centrally located member 34. This nesting of the several parts to compose the main wheel structure places the outer tire rim under tension and the cushion rims and central member under compression and as a consequence the main body of the wheel, while very light, is, nevertheless, exceedingly strong and entirely free from those stresses tending to breakage, which would necessarily occur in a cast wheel having cushion pockets. My structure is also free from those weaknesses which would necessarily result from the cutting of cushion pockets in plates or disks forming the main body of the wheel. Said clencher rings 30 are also held in place and clamped on each side of each cushion 22 by intermediate brace bars 36 which have end flanges that partially envelop the rings 30 and are drawn together and clamped against said rings 30 by a bolt 37, see Fig. 2.

Hence, each pair of clencher rings 30 are clamped and held in place at four points, see Fig. 1, whereby the periphery of each cushion is securely mounted and held. As seen in Fig. 3, the main body of the cushion 22 extends through and operates between widened portions of the bars 20, as at 120, so that radial play of the cushion is permitted without interference from the bars 20.

There is a brake drum 40 secured to the bolts 21 and formed as shown in Fig. 5, and there is a plate 41 extending around the inner reduced portion of the brake drum so that said plate 41 and the brake drum overlap the side plate 15 and the joint between said plates is closed by felt strips 42 held in place by rivets 43 on the side plate 15. This makes the wheel dust proof so that dust cannot enter the interior thereof.

The pneumatic cushions 22 are inflated through air tubes 45, see Fig. 1, which extend from the several cushions to a point near the center of the wheel where they are readily accessible.

In operation the series of air cushions 22 coöperate for yieldingly supporting the load and floating inner frame within the outer casing or frame of the wheel so that all shock and jar will be taken up by the cushions.

The invention claimed is:

1. A vehicle wheel including an outer structure having a recessed tire rim, a central hub structure, a series of annular pneumatic cushions for supporting the hub structure within said external structure, and a clencher rim surrounding each cushion with its outer portion embedded in a part of the recesses in the tire rim.

2. A vehicle wheel including a tire rim, a centrally located member, a hub located loosely within said centrally located member, a series of intermediate cushion receiving rims held under compression by and between said tire rim and centrally located member, and cushions in said cushion receiving rims for supporting said hub.

3. A vehicle wheel having a main body comprising a tire rim, a circular series of annular cushion-receiving rims nested within the tire rim, means for preventing relative rotation of said cushion rims within the tire rim, and a central member nested between and acting upon the several cushion-receiving rims in such manner as to firmly nest said cushion receiving rims within the tire rim with said tire rim under tension.

4. A vehicle wheel having a main body comprising a tire rim, a circular series of annular cushion-receiving rims nested within the tire rim, means for preventing relative rotation of said cushion rims within the tire rim, a central member nested between and acting upon the several cushion-receiving rims in such manner as to firmly nest said cushion receiving rims within the tire rim with said tire rim under tension, an annular cushion mounted in each of said cushion-receiving rims, a hub member radially movable relative to the main wheel body, and means carried by said hub member for engaging the eyes of the annular cushions.

5. A vehicle wheel having a main body comprising an annular metal tire rim, a circular series of metal cushion-receiving rims nested within the tire rim, and means for holding said annular series of cushion-receiving rims outwardly against tension in the tire rim a hub located loosely within said holding means, and cushions in said cushion receiving rims for supporting said hub.

6. A vehicle wheel including a tire rim, a centrally located member, a hub located loosely within said centrally located member, a series of intermediate cushion-receiving rims held under compression by and between said tire rim and centrally located member, each of said parts being provided with means for laterally engaging the adjacent part or parts so as to prevent the relative lateral displacement thereof, and cushions in said cushion receiving rims for supporting said hub.

7. A vehicle wheel including a tire rim, an annular series of cushion receiving rims in engagement with said rim, a hub, a member loosely surrounding said hub located centrally within said series of cushion rims and engaging the inner portions thereof, and adapted to force said cushion rims outwardly and hold the same under compression against said tire rim, and cushions in said cushion receiving rims for supporting said hub.

8. A vehicle wheel including a tire rim, a centrally located member, and a series of intermediate cushion receiving rims held under compression by and between said tire rim and centrally located member.

9. A vehicle wheel having a main body comprising an annular metal tire rim, a circular series of metal cushion-receiving rims nested within the tire rim, and means for holding said annular series of cushion-receiving rims outwardly against tension in the tire rim.

10. A vehicle wheel including a tire rim, a centrally located member, and a series of intermediate cushion-receiving rims held under compression by and between said tire rim and centrally located member, each of said parts being provided with means for laterally engaging the adjacent part or parts so as to prevent the relative lateral displacement thereof.

11. A vehicle wheel including a tire rim, an annular series of cushion-receiving rims in engagement with said rim, and a member located centrally within said series of cushion rims and engaging the inner portions thereof, and adapted to force said cushion rims outwardly and hold the same under compression against said tire rim.

12. A vehicle wheel including a tire rim, an annular series of cushion-receiving rims in engagement with said rim, and a member located centrally within said series of cushion rims and engaging the inner portions thereof and when combined with the foregoing parts having a diameter such as to force the cushion rims outwardly against the tire rim and maintain the same under compression.

13. A vehicle wheel having a main body comprising a rim, a circular series of cushion-receiving rings nested within the rim, and a central ring nested between and acting upon the several cushion-receiving-rings in such manner as to firmly nest said cushion-receiving-rings within the rim with said rim under tension.

14. A vehicle wheel having a main body comprising a rim, a circular series of cushion-receiving-rings nested within the rim, a central ring nested between and acting upon the several cushion-receiving-rings in such manner as to firmly nest said cushion-receiving-rings within the rim with said rim under tension, an annular cushion mounted in each of said cushion-receiving-rings, a hub member radially movable relative to the main wheel body, and means carried by said hub member for engaging the eyes of the annular cushions.

In witness whereof, I have hereunto affixed my signature, this 11th day of April, 1917.

HENRY B. COATS.